INVENTOR.
CALVIN C. WILLIAMSON

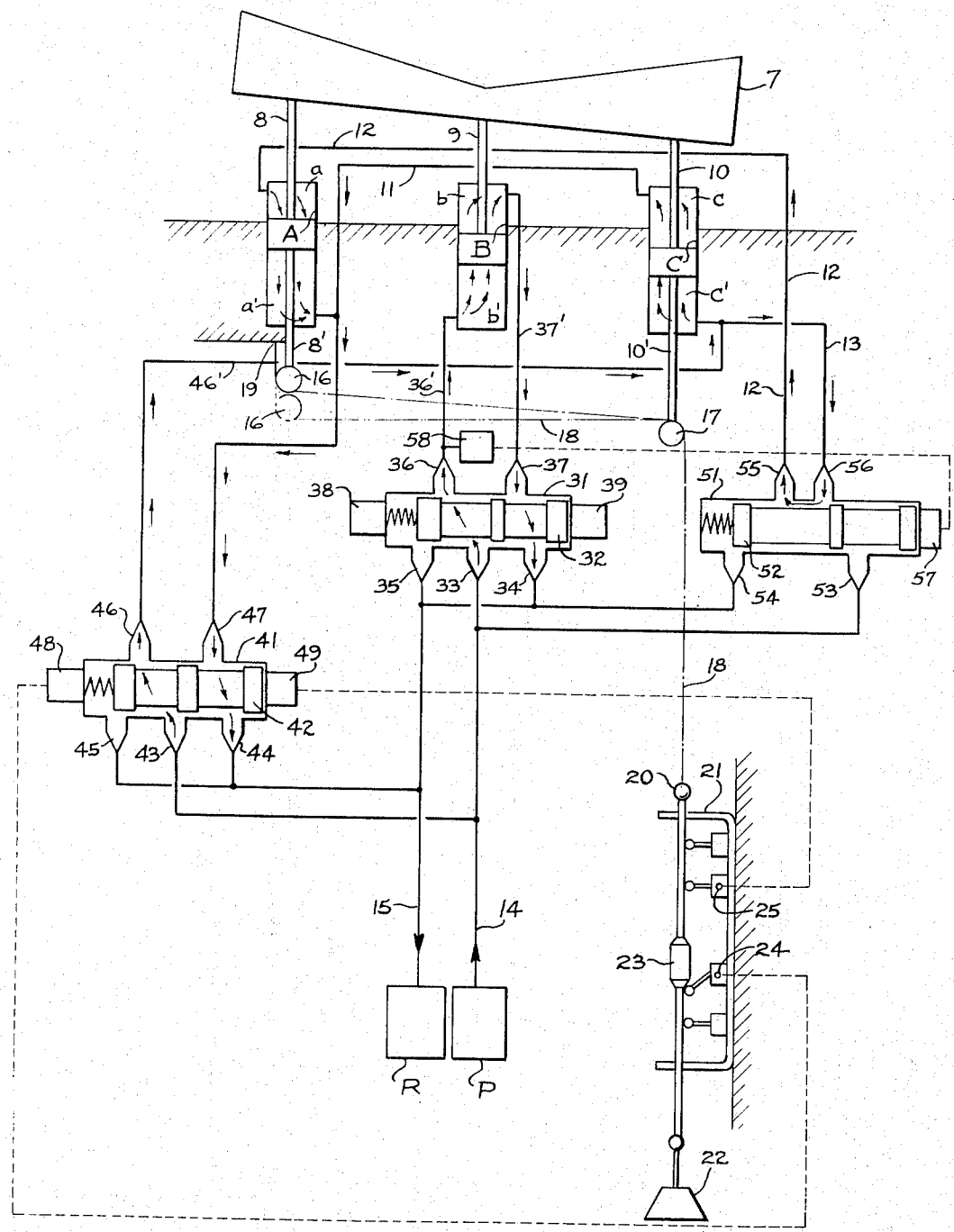

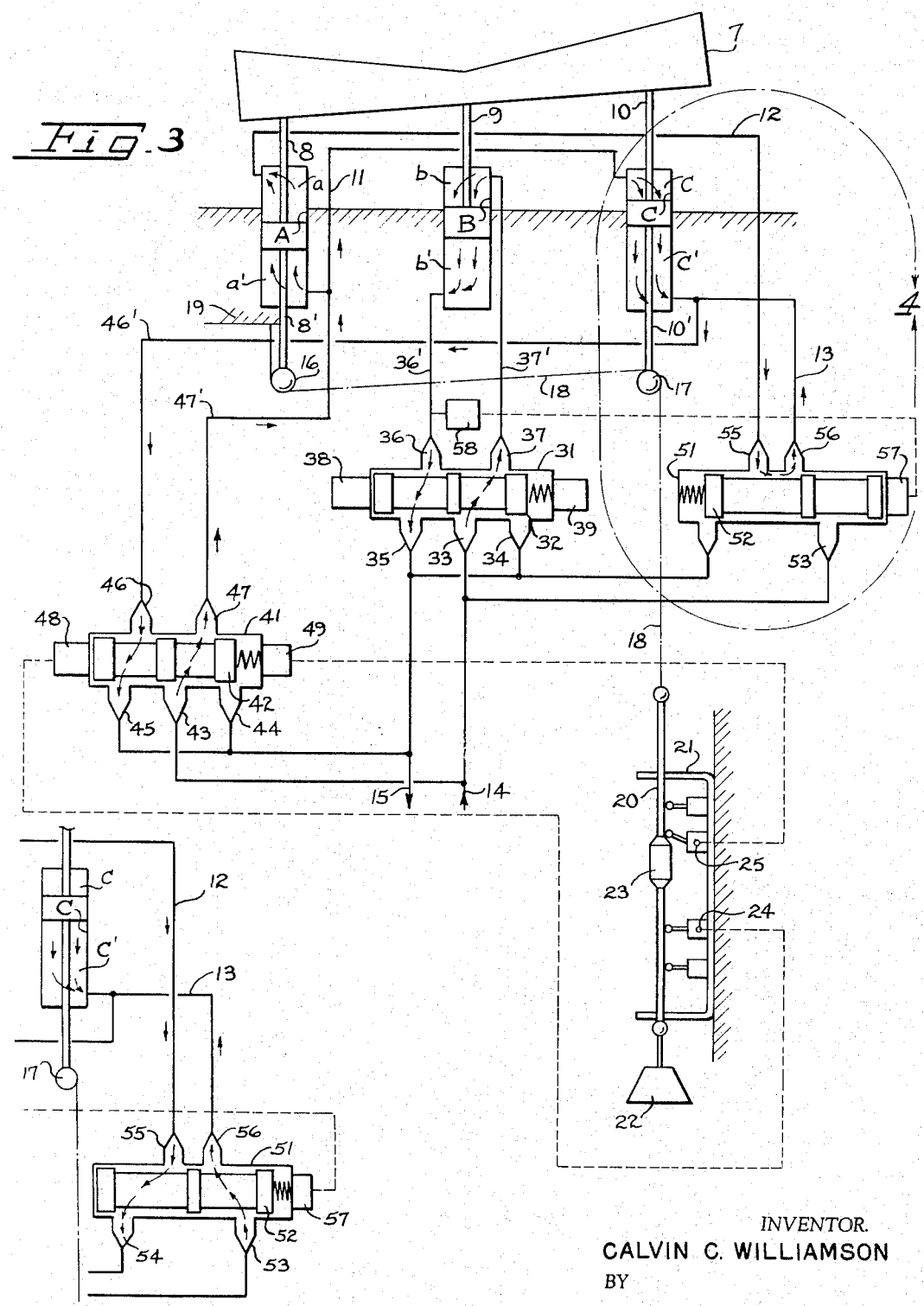

United States Patent Office 3,355,993
Patented Dec. 5, 1967

3,355,993
DRIVE BALANCING APPARATUS
Calvin C. Williamson, San Francisco, Calif., assignor to Soule Steel Company, San Francisco, Calif.
Filed Nov. 17, 1965, Ser. No. 513,641
7 Claims. (Cl. 91—171)

ABSTRACT OF THE DISCLOSURE

Drive balancing apparatus in which an elongate driven member is connected to the piston rods of double-ended hydraulic cylinders having additional rods extending through the opposite ends of the cylinder, the additional rods connected by a cable and pulley system for detecting relative movement of the pistons. The front chamber of one of the cylinders is connected to the rear chamber of the other cylinder and its front chamber connected to the rear chamber of the first for balancing the fluid pressures in the respective cylinders in order to correct the alignment of the driven member.

---

The present invention relates in general to a balanced drive apparatus and more particularly to apparatus for applying an even driving force to an elongate driven member such as a shearing bar.

In many instances it is desirable, and oftentimes necessary, to provide a balanced driving force to an elongate driven member and to correct any imbalance in the driving force applied to the driven member. One particular application for a balanced driving force applied to an elongate driven member is in a scrap steel reclaiming operation in which junked automobiles are crushed relatively flat and then sheared into smaller pieces by an elongate shear. Then the pieces are again reduced in size by another shear and conveyed to a furnace in which substantially all non-steel material is consumed. The first shear is about eight feet in length and proper balance of a shear of such size is quite critical. While the present invention will be described as specifically applied to the operation of a large shear utilised in a shearing apparatus, it will be evident upon reading the following description that the apparatus described are equally applicable to any driven member such as, for example, a press which becomes misaligned during use.

One object of the present invention is to provide apparatus for maintaining an elongate member in a desired balanced alignment by detecting imbalances in the alignment of the elongate member and applying spaced apart oppositely directed correcting forces from series connected hydraulic cylinders to the elongate member until the member is returned to balanced alignment.

One feature and advantage of this balancing apparatus lies in the fact that it can operate unattended and the series connected balance restoring cylinders hold the member in balanced alignment even when they are not applying balance restoring forces thereto.

Another feature and advantage of this invention is that this balancing apparatus operates to maintain balanced alignment of a moving member.

Another object of this invention is to provide apparatus for balanced drive of an elongate driven member. Accordingly, a driving force is applied to the driven member and two balancing, fluid actuated cylinders are connected to the driven member at different positions along the length of the driven member. Imbalances in the driven member are detected and balance restoring forces are applied to the driven member by the balancing cylinders until the imbalance is corrected.

Another feature and advantage of this invention lies in the fact that the driven member will follow a given path and the possibility of the driven member jamming with other associated apparatus is eliminated.

Another feature and advantage of the invention when the driven member is a large shear bar is that a smooth shearing cut will be produced precisely at the desired position.

Another object of the present invention is the provision of a main forward and backward driving hydraulic cylinder connected to the driven member substantially midway thereof and auxiliary balancing hydraulic cylinders connected along the length of the driven member on opposite sides of the main driving cylinder for driving and guiding the driven member with the balancing cylinders serially connected together in a closed circuit during balanced movement of the driven member.

Still another feature and advantage of such a driving and balancing structure is that during balanced movement of the driven member hydraulic fluid need be provided to only the main driving cylinder.

Still another object of this invention is the provision in such a driving and balancing system of a hydraulic valve which will maintain the balancing cylinders in a closed circuit for balanced movement of the driven member and permit pressurized fluid flow to the intake side of the lagging cylinder piston and the output side of the leading cylinder piston and from the output side of the lagging cylinder piston and the intake side of the leading cylinder.

An additional feature and advantage of this balancing structure lies in the fact that the same hydraulic valve will operate to correct imbalances that may occur in either of two directions when the driven member is going either forward or backward.

Another object of the present invention is to provide in such a driving system a sequencing valve which is operative to convert the balancing cylinders into balancing and driving cylinders when sufficient hydraulic pressure is provided to the main driving cylinder.

Still another feature and advantage of this driving apparatus lies in the fact that the balancing cylinders can be converted into driving and balancing cylinders without affecting the balance of the driving force applied to the driven bar. Thus the driving and balancing system can operate with one driving cylinder if only a small fluid pressure is required to move the driven member but can operate with more driving cylinders if greater pressure is required to move the driven member.

Still another object of this invention is the provision in such a driving and balancing system of piston rods extending from the back side of balancing cylinder pistons and means for detecting a change in the positions of these piston rods relative to one another for detecting an imbalance in the driven member.

Still another feature and advantage of such an imbalance detecting structure lies in the fact that no obstructions lie between the hydraulic cylinders and the driven members to cause jamming or limitation in the movement of the driven member.

Other objects of the present invention will become apparent upon reading the following specification and referring to the accompanying drawing in which similar characters of reference represent corresponding parts in each of the several views.

In the drawing:

FIG. 2 is a view similar to FIG. 1 illustrating forward movement of the shearing member and a correction of shearing member imbalance in one direction;

FIG. 3 is a view similar to FIG. 2 illustrating retraction of the driven member and correction of an imbalance of the driven member in the opposite direction of the imbalance shown in FIG. 2; and FIG. 4 is a view illustrating the operation of that portion of the structure illustrated in FIG. 1 delineated by line 4—4.

Figure 1:
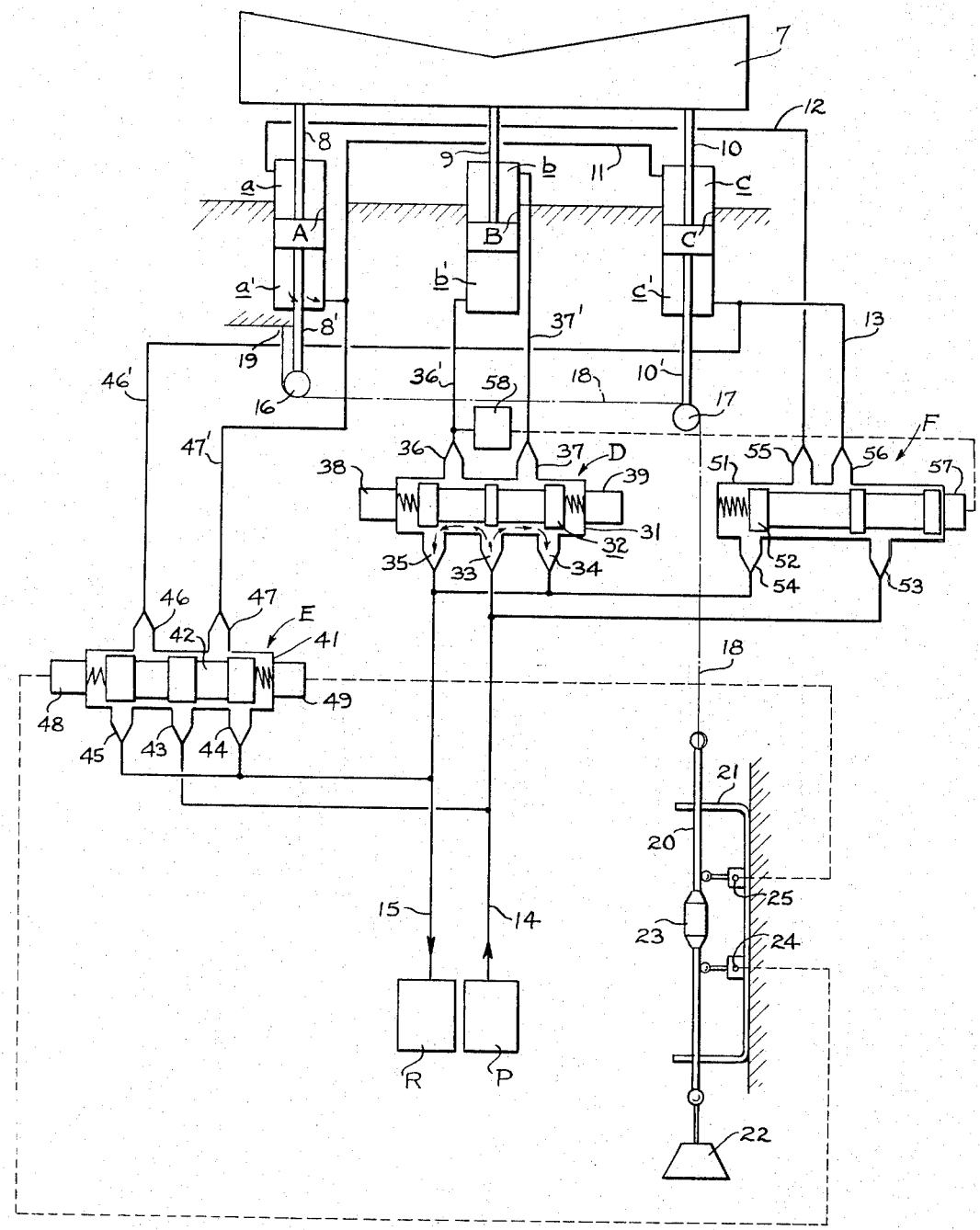
FIG. 1 is a schematic diagram showing the structure for driving a shear bar and correcting any imbalance in the driving force, the apparatus being illustrated in stationary position.

Referring now to FIG. 1 of the drawing, the drive balancing structure for a driven member such as, for example, a shear bar 7 includes three hydraulic cylinders A, B and C, the respective piston rods 8, 9 and 10 of which are respectively secured adjacent the left end, the center and the right end of the shear bar 7. The cylinders A, B and C and associated apparatus are supported on a mounting frame M with the shear bar 7 free to be driven against shear blades (not shown).

The movement of the pistons in hydraulic cylinders A, B and C is controlled by three hydraulic valves: a main drive valve D, an imbalance control valve E and a sequencing valve F, all of which are described in greater detail below.

The valve D is a hydraulic control valve for controlling the forward and reverse movement of the shear bar 7, and is a five port, three position, solenoid operated valve. The valve includes a cylindrical casing 31 housing a slidable, stepped diameter, fluid control shaft 32 therein to control the communication between certain of the five ports in the casing 31. The ports include a hydraulic fluid inlet port 33 and outlet ports 34 and 35 for forward and reverse movement, respectively, of the bar 7. Also included in the casing 31 are ports 36 and 37 communicating respectively through fluid lines 36' and 37' with the rear and forward chambers b' and b respectively, of the main drive cylinder B. Hydraulic fluid from a hydraulic pump P passes through a pump line 14 to the input port 33 while outlet ports 34 and 35 communicate through a return line 15 to the hydraulic fluid reservoir tank R. Solenoids 38 and 39 are provided at opposite ends of the cylindrical casing 31 for maintaining the shaft 32 in one of three positions, one position when neither of the solenoids is energized and the other two positions when each one of the solenoids 38 and 39 is energized separately.

Hydraulic valve E is of similar construction as valve D and includes a casing 41, a stepped diameter fluid control shaft 42 slidable in the casing 41, shaft position control solenoids 48 and 49 and five fluid ports 43–47 including an inlet port 43 connected to the fluid input line 14, outlet ports 44 and 45 connected with the fluid return line 15 for use in correcting imbalance in the shear bar 7 when the right end and left end of the bar, respectively, are lagging during forward movement, and ports 46 and 47, respectively, communicating through lines 46' and 47' with the rear chamber c' of cylinder C and the rear chamber a' of cylinder A. Solenoids 48 and 49 maintain the shaft 42 in one of three positions in the same manner as the solenoids described above with respect to valve D.

Sequencing valve F is a four port, two position, solenoid operated valve which includes a casing 51 enclosing a slidable, stepped diameter, fluid control shaft 52 which is actuated by means of a solenoid 57. The four ports 53–56 in the casing include an inlet port 53 connected to pump line 14, outlet port 54 connected to fluid return line 15, and two additional ports 55 and 56. Port 55 communicates with the forward chamber a of cylinder A via a line 12 and port 56 communicates with line 46' and the rear chamber c' of cylinder C via a line 13.

The solenoid 57 is actuated by a pressure switch 58 in line 36' to maintain the valve F in one of two positions.

A line 11 connects the forward chamber c of cylinder C with the rear chamber a of cylinder A and with the line 47'.

A mechanism for detecting imbalance of the shear bar 7 includes rear piston rod extensions 8' and 10' for cylinders A and C, each of the extensions 8' and 10' being provided on the rear end thereof with a pulley-wheel 16 and 17 respectively. A cable 18 secured at its upper end 19 to the frame M extends vertically downward and over the pulley-wheel 16, then extends horizontally toward and over the pulley-wheel 17 where it changes direction and moves vertically downward. The lower end of the cable 18 is secured to the top of a rod 20 which is slidably held in a vertical position by a bracket 21 and which is urged downward by a weight 22 attached at the bottom thereof. At its center portion, the rod 20 is provided with an enlarged diameter cam surface 23 which, upon vertical movement of the rod 20, will actuate limit switches 24 and 25 positioned, respectively, below and above the position of the cam surface 23 when the shear bar 7 is in balance. Limit switches 24 and 25 serve to energize valve E solenoids 48 and 49 respectively.

When the shear bar 7 is in balance the pulleys 16 and 17 are positioned to cause the cable 18 to extend horizontally therebetween. When the shear bar 7 is moved but remains in balance, the piston rods 8' and 10' move equal distances thereby changing the position of the horizontal stretch of the cable 18 along the length of the cable 18 without moving the rod 20 and cam surface 23 up or down. However, when the shear bar 7 becomes out of balance and the piston rods 8' and 10' have moved unequal distances from rest as shown in FIGS. 2 and 3, the rod 20 is either moved down or up to actuate the switches 24 and 25, respectively.

To illustrate the operation of the present invention the system is shown in its stationary position in FIG. 1 with valve D in its neutral position whereby fluid from line 14 is able to flow in port 33 and out ports 34 and 35 to the line 15. Valve E is also in its neutral position with fluid flow between any two ports prevented and valve F is in its disengaged position in which fluid is not able to enter or leave through inlet or outlet ports 53 and 54 but ports 55 and 56 communicate with one another.

In order to advance the shear bar 7 as illustrated in FIG. 2, solenoid 38 in valve D is energized to permit fluid flow from port 33 to port 36 through line 36' into the rear chamber b of cylinder B to move the piston in cylinder B forward. Fluid from the forward chamber b flows out line 37' through port 37 to port 36 and to line 15 back to the reservoir. Under normal operating conditions, the shear bar 7 will remain in balance as cylinders A and C are tied together in series by the closed circuit consisting of lines 11, 12 and 13 as shown in FIG. 1. As the piston in main cylinder B is moved forward, the piston in cylinder A will move forward to move fluid in chamber a through line 12 to ports 55 and 56, thence to line 13 and into chamber c' while fluid from the front chamber c of cylinder C flows through line 11 to chamber a'. However, due to leakage in this closed circuit, the shear can go out of balance and is again balanced by operation of hydraulic valve E.

An imbalance in which the piston in cylinder A is in front of the piston in cylinder C is corrected in the manner illustrated in FIG. 2. The imbalance is detected by the fact that pulley 17 has moved down a distance further than pulley 16, thereby lowering the bar 20 to cause cam 23 to actuate limit switch 24. Limit switch 24 energizes solenoid 48 in valve E to slide the shaft 42 so that port 43 communicates with port 46 and port 47 communicates with port 44. Under such conditions, fluid from the input line 14 passes through port 43, out port 46, into line 46' and into the rear chamber c' of cylinder C. Fluid pressure is also applied from line 46' via lines 13 and 12 against the fluid leaving chamber a. Thus, more fluid is flowing into chamber c' than into chamber a' and the excess fluid which necessarily must be flowing out of chamber c and camber a' flows via lines 11 and 47' through ports 47 and 44 to the outlet line 15. This operation causes cylinder C to speed up and cylinder A to slow down until the shear bar returns to a balanced condition in which the cam 23 no longer trips limit switch 24 and valve E is de-energized blocking the flow of oil through the valve.

Since the shear bar is moving forward in the illustration in FIG. 2 the piston in cylinder A may, in fact, not be moving backward as illustrated but may be standing still or moving forward slowly until the piston in cylinder C catches up with it.

FIG. 3 illustrates the flow of hydraulic fluid through the system when valve D is actuated to reverse the direction of the shear bar 7 and valve E is actuated to correct an imbalance in which the piston in cylinder C is lagging (in the reverse direction) and the piston in cylinder A is leading.

As is apparent from the above, imbalance of the shear bar 7 in either of two directions is corrected by valve E regardless of whether the shear bar is advancing or reversing.

Referring now to FIG. 4, there is shown the operation of valve F. During most of the forward shearing stroke force required to move the shear bar is supplied by cylinder B alone, cylinder A and cylinder C functioning only as balancing units. However, when the pressure in cylinder B rises above a certain level, pressure switch 58 in line 36′ energizes the solenoid 57 of valve F to cause the shaft 52 to shift to the position shown in FIG. 4. As shown in FIG. 4, port 53 communicates with port 56 and port 55 communicates with port 54. This position of valve F enables hydraulic fluid to feed to chamber c′ of cylinder C, from chamber c to chamber a′ of cylinder A and from chamber a back to valve F providing additional shearing force for the forward structure. Should the heavy work be done on the return stroke rather than on the forward stroke, the connection of lines 12 and 13 can be reversed to ports 56 and 55 respectively. As is apparent, the balancing system will continue to operate in the same manner as described above after valve F is actuated.

As is obvious with reference to FIG. 4, a driving and balancing system without the sequencing feature just described can be provided using just two cylinders such as cylinders A and C without the necessity for a main driving cylinder B. Such a system would be constructed in the manner described above with respect to the system illustrated in FIG. 4 but omitting cylinder B and valve D and maintaining valve F in the open position with solenoid 57 energized.

Also, while the system has been illustrated and described with respect to a system wherein the driven member is directed vertically upward, the driven member can be directed in any direction so long as the cable 18 and rod 20 are held taut by the weight 22 or, alternatively, by a spring if the rod is not held in the vertical position illustrated.

Furthermore, while the imbalance detection system is shown as operating with pulleys on the piston rod extensions 8′ and 10′, other mechanisms such as means cooperating with piston rods 8 and 10 or with the pistons within cylinders A and C are possible.

Also, instead of cylinders A, B and C all being identical the main driving cylinder B could be larger than the others.

While the invention has been described as applicable to a driven member it applies equally well to balancing a substantially stationary member. Referring to FIG. 1 by omitting cylinder B, by connecting line 12 directly to line 13, and by omitting valves D and F, the cylinders A and C controlled by valve E maintain the balance of the bar 7 which is a substantially stationary member. Furthermore, in this embodiment the cylinders A and C which are series connected when the bar 7 is in balance serve to support the bar 7 and resist the imbalancing effect of other forces applied to the bar 7.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A balanced apparatus comprising: an elongate member having a predetermined balanced alignment; at least two fluid actuated balancing cylinders, each having a piston dividing the cylinder into a front and a rear chamber both of which can serve as intake or output chambers, said cylinders spaced apart along the length of said member; piston rods connecting each of said pistons to said member; means providing fluid communication between the front chamber of one of said cylinders and the rear chamber of another of said cylinders; means providing fluid communication between the front chamber of said other cylinder and the rear chamber of said one cylinder; means for detecting an imbalance in the predetermined alignment of said member; and means responsive to said detecting means for providing fluid communication from a fluid pump supply line to the lagging side of the lagging piston and the leading side of the leading piston, and for providing fluid communication from the lagging side of the leading piston and the leading side of the lagging piston to a fluid pump return line to apply correcting forces to said member to correct alignment of said member to said predetermined alignment.

2. The apparatus according to claim 1 wherein said detecting means includes: extension piston rods connected to each of said pistons and projecting from said balancing cylinders in a direction away from said member; and means responsive to the position of said extension piston rods relative to one another for detecting an imbalance in the predetermined alignment of said member.

3. Apparatus for providing a balanced driving force to a driven member comprising: an elongate driven member; hydraulic piston means for applying a driving force to said driven member to drive said driven member in a given direction; at least two fluid actuated balancing cylinders spaced apart along the length of said driven member, each of said cylinders being provided with a piston therein; first piston rods connecting the pistons in each of said balancing cylinders to said driven member; second piston rods connected to each of said pistons and projecting from said balancing cylinders in a direction away from said driven member; means responsive to the position of said second piston rods relative to one another for detecting an imbalance in the moving direction of said driven member; and hydraulic valve means responsive to said detecting means for directing additional hydraulic fluid to and from said balancing pistons to apply correcting forces to said driven member to correct the moving direction of said driven member to said given direction, said hydraulic valve means comprising means for directing additional hydraulic fluid to the fluid intake side of the lagging piston and the fluid output side of the leading piston and for taking returning fluid from the output side of the lagging piston and the intake side of the leading piston.

4. The apparatus according to claim 3 wherein said hydraulic valve means includes means for directing additional hydraulic fluid to the fluid intake side of the lagging piston and the fluid output side of the leading piston and for taking returning fluid from the output side of the lagging piston and the intake side of the leading piston.

5. Apparatus for providing a balanced driving force to a driven member by means of hydraulic fluid from a pump line and to a return line comprising: an elongate driven member; at least three hydraulic cylinders, each having a piston dividing the cylinder into a front and a rear chamber, both of which can serve as intake or output chambers and a piston rod connected to said piston and at the front of said cylinder to said driven member and including a first driving hydraulic cylinder connected by a piston rod to said driven member substantially midway thereof, and second and third hydraulic balancing cylinders connected by their respective piston rods to said driven member on opposite sides of said first hydraulic cylinder; means for applying fluid from said pump line to the front or rear chambers of said first cylinder to respectively drive said driven member forward or backward; means providing fluid communication between the front chamber of said second cylinder and the rear chamber of said third cylinder; means providing fluid communication between the front chamber of said third cylinder and the rear chamber of said second cylinder; means for detecting an imbalance in the moving direction of said driven member; means responsive to said detecting means for providing fluid communication from said pump line to the fluid intake side of the lagging piston and the fluid output side of the leading piston in said balancing cylinders and for providing fluid communication from the output side of the lagging piston and the intake side of the leading piston of said balancing cylinders to said return line to apply correcting forces to said driven member to correct the moving direction of said driven member to said given direction; and means responsive to heavy load resistance on said driven member for directing fluid from said pump line to the rear chamber of said third cylinder and from the front chamber of said second cylinder to said return line, thereby to cause said second and third balancing cylinders to serve as driving cylinders when the load resistance on the driven member is high.

6. Apparatus for providing a balanced driving force to a driven member by means of hydraulic fluid from a pump line and to a return line comprising: an elongate driven member having a given balanced alignment; means for applying a driving force to said driven member to drive said driven member in a given direction; at least first and second spaced apart hydraulic cylinders, each of said cylinders having a piston and a piston rod, said piston dividing said cylinder into a front and a rear chamber both of which can serve as intake or output chambers and said piston rod connected at one end to such piston and at the other end to said driven member; means providing fluid communication between the front chamber of said first cylinder and the rear chamber of said cylinder; means providing fluid communication between the rear chamber of said first cylinder and the front chamber of said second cylinder; means for applying fluid from said pump line to the rear chamber of said second cylinder and returning fluid from the front chamber of said first cylinder to said return line; means for detecting an imbalance in the given alignment of said driven member; and means responsive to said detecting means for providing communication from said pump line to the fluid intake side of the lagging piston and to the fluid output side of the leading piston and from the output side of the lagging piston and the intake side of the leading piston to said return line.

7. The apparatus of claim 6 wherein said detecting means includes extension piston rods connected to the pistons of said first and second cylinders and extending from said cylinders in the direction opposite from said driven member and means responsive to the position of said extension piston rods relative to one another for detecting imbalance in the moving direction of said driven member.

References Cited

UNITED STATES PATENTS

| | | | |
|---|---|---|---|
| 2,441,925 | 2/1948 | Wege | 91—171 |
| 2,484,908 | 10/1949 | Purcell | 91—171 |
| 2,559,733 | 7/1951 | Pitman et al. | 92—166 |
| 2,574,299 | 11/1951 | Sterrett | 92—166 |
| 2,764,869 | 10/1956 | Scherr | 91—171 |
| 3,039,513 | 6/1962 | Lasiewicz et al. | 91—171 |

FOREIGN PATENTS

| | | |
|---|---|---|
| 569,461 | 1/1959 | Canada. |

MARTIN P. SCHWADRON, *Primary Examiner.*

PAUL E. MASLOUSKY, *Examiner.*